United States Patent [19]

Suzuki et al.

[11] Patent Number: 4,667,285
[45] Date of Patent: May 19, 1987

[54] MICROCOMPUTER UNIT

[75] Inventors: Tetsuo Suzuki, Tokyo; Sinji Nishikawa, Kawasaki, both of Japan

[73] Assignee: Fujitsu Limited, Kawasaki, Japan

[21] Appl. No.: 449,577

[22] Filed: Dec. 14, 1982

[51] Int. Cl.⁴ .............................................. G06F 11/30
[52] U.S. Cl. .................................. 364/200; 364/900; 371/21
[58] Field of Search ... 364/200 MS File, 900 MS File; 371/19, 21

[56] References Cited

U.S. PATENT DOCUMENTS

| | | | |
|---|---|---|---|
| 3,757,308 | 9/1973 | Fosdick | 364/200 |
| 3,921,142 | 11/1975 | Bryant et al. | 364/900 |
| 3,962,683 | 6/1976 | Brown et al. | 364/200 |
| 4,023,142 | 5/1977 | Woessner | 364/200 |
| 4,112,490 | 9/1978 | Pohlman et al. | 364/200 |
| 4,128,873 | 12/1978 | Lamiaux | 364/200 |
| 4,153,933 | 5/1979 | Blume, Jr. et al. | 364/200 |

OTHER PUBLICATIONS

Capece, R. P. and Posa, J. G.: ed's; Microprocessors and Microcomputers: One-chip Controllers to High-end Systems; 1981, pp. 17-22, 40-45, 91-97.

Primary Examiner—Gareth D. Shaw
Assistant Examiner—Christina M. Eakman
Attorney, Agent, or Firm—Staas & Halsey

[57] ABSTRACT

A microcomputer unit containing therein a plurality of registers each with an address allotted in advance. The registers can be accessed for monitoring by an external address signal when the allotted address thereof and the external address signal coincide with each other. In this case, operation of the microcomputer is stopped by an external HALT signal and then the content of the register to be monitored is read by a monitor (MNT) signal MNT, so that the content thereof is fed externally from the microcomputer unit.

12 Claims, 8 Drawing Figures (a) HALT
(b) ALE
(c) P0.0~P0.7
(d) P1.0~P1.7
(e) P2.0~P2.7
(f) MNT

MICROCOMPUTER UNIT

BACKGROUND OF THE INVENTION

1. Field of the Invention

The present invention relates to a microcomputer unit, more particularly to a microcomputer unit having a monitoring function wherein the content of an arbitrarily specified register in the microcomputer unit can be read externally without changing the internal status of the computer system.

2. Description of the Prior Art

A microcomputer unit, especially a single chip microcomputer unit, is usually provided with a so-called HALT terminal or, similarly, a so-called SINGLE-STEP terminal. Application of a corresponding signal to such a HALT terminal (hereinafter only the former terminal is mentioned) momentarily stops the operation of the computer. During the halt time, the content of a specified register at the time of the stopping of the operation is externally read outside the microcomputer unit. The read content can be used for monitoring the internal status in the single chip microcomputer unit, for example, for debugging of a program.

In the prior art, the content of a specified register is read by running or executing instructions in the computer system. First, a read instruction for the specified register is externally supplied to the microcomputer unit. Then, a central processing unit (CPU) executes a corresponding read operation to transfer the content of the specified register to a predetermined port of the microcomputer unit. Since the read instruction is executed while the CPU is running, however, the opertion or states of the computer unnecessarily advance several steps during the execution of the read instruction. This makes it impossible to read the content of the register at the moment when the read instruction is supplied. This is a first defect of the prior art.

Further, in the above-mentioned monitoring operation, the read instruction is usually applied to an interrupt (INT) terminal of the microcomputer unit. Accordingly, if such an INT terminal is occupied by a user program, there is no inlet for supplying such a read instruction. This is a second defect of the prior art.

SUMMARY OF THE INVENTION

It is an object of the present invention to overcome the above-mentioned two defects and thereby improve the monitoring function in a microcomputer unit.

The above object is attained by a microcomputer unit which is provided with, at least, port means through which communication is achieved between the inside and outside of the microcomputer unit and a plurality of registers to which addresses are allotted in advance. Each register cooperates with a control circuit. When a first terminal receives an external HALT signal and a first port receives an external address signal for specifying a desired register and when a second terminal further receives a MONITOR signal, the content of the specified register is output through the second port by means of the control circuit.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
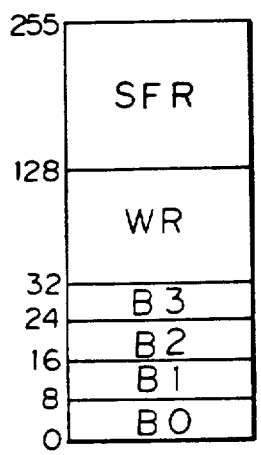
FIG. 1 is a schematic representation of an address allocation set up in a microcomputer unit according to the present invention.

FIG. 1 depicts a schematic representation of an address allocation set up in a microcomputer unit according to the present invention. In the present invention, addresses are allotted in advance to all the registers such as random access memories (RAM's). According to the example of FIG. 1, there are 256 addresses, i.e., 0 through 255. Half of the addresses, i.e., 0 through 127, are allotted to general purpose registers B0 through B3, corresponding to a bank #0 to bank #3, and a work register WR. The remaining half of the addresses, i.e., 128 through 256, are allotted to special function registers SFR's. The following table recites detailed address allocations for the SFR's. Each asterisked SFR can achieve a so-call bit access operation.

TABLE

| Register | Symbol | Address |
| --- | --- | --- |
| Interrupt priority control | IPC | B8(184) |
| Interrupt enable control | IEC | A8(168) |
| Timer mode | TMOD | 89(137) |
| Timer control | TCON* | 88(136) |
| Timer 1 (upper) | TH1 | 8D(141) |
| Timer 2 (lower) | TL1 | 8B(139) |
| Timer 0 (upper) | TH0 | 8C(140) |
| Timer 0 (lower) | TL0 | 8A(138) |
| Serial control | SCON | 98(152) |
| Serial data buffer | SBUF | 99(153) |
| Accumulator | ACC* | E0(224) |
| B register | B* | F0(240) |
| Program status word | PSW* | D0(208) |
| Stack pointer | SP | 81(129) |
| Data pointer (upper) | DPH | 83(131) |
| Data pointer (lower) | DPL | 82(130) |
| Port 3 | P3* | B0(176) |
| Port 2 | P2* | A0(160) |
| Port 1 | P1* | 90(144) |
| Port 0 | P0* | 80(128) |
| Program counter | PCH | C1(193) |
| Program counter | PCL | C0(192) |

Figure 2:
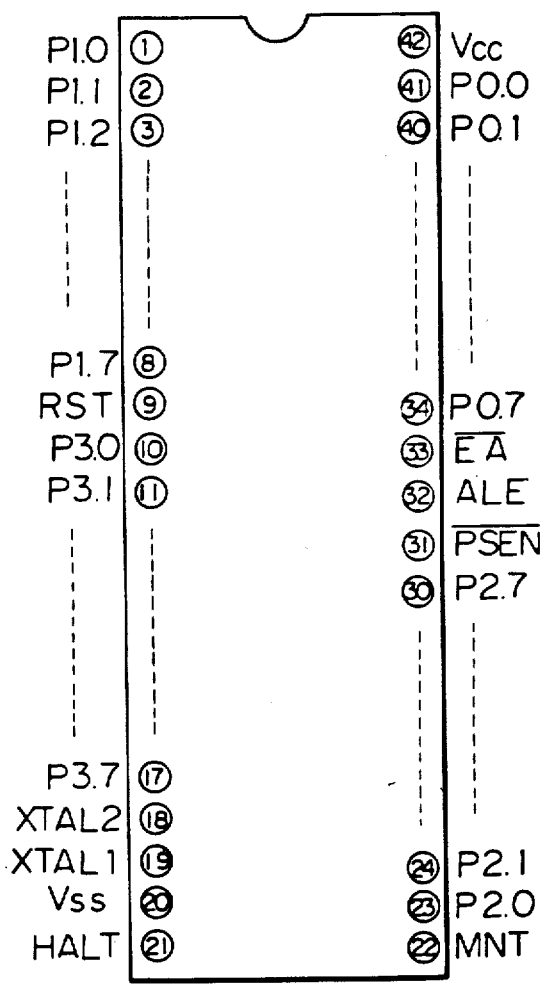
FIG. 2 is an arrangement of a plurality of pins provided by a single chip microcomputer unit according to the present invention.

FIG. 2 illustrates an arrangement of a plurality of pins provided for a single chip microcomputer unit according to the present invention. In FIG. 2, there are, for example, 42 pins, such as ① through ㊷. The pin ㉒ monitor (MNT) is characteristic of the present invention, while the remaining pins are common to the prior art. The pins ① to ⑧ work as 8-bit input/output (I/O) ports P1.0 to P1.7. Similarly, the pins ⑩ to ⑰ work as 8-bit I/O ports P3.0 through P3.7; the pins ㉓ to 30 work as 8-bit I/O ports P2.0 to P2.7; and the pins ㉞ to ㊶ work as 8-bit I/O ports P0.0 through P0.7. The remaining pins ㊷, ⑳, ⑨, ⑱, ⑲, and ㉑, respectively, are allotted to a power source pin $V_{CC}$, a power source pin $V_{SS}$, a reset pin RST, a first oscillator XTAL1, a second oscillator XTAL2, and a HALT pin. The pin ㉒, mentioned previously, is newly incorporated with the pins as a monitor (MNT) pin, according to the present invention. The pins ㉛ (PSEN), ㉜ (ALE), and ㉝ (EA) deal with $\overline{PSEN}$, ALE, and $\overline{EA}$ signals. The symbol $\overline{EA}$ denotes an external address signal. If no signal EA exists, the microcomputer executes a job in accordance with only the instructions stored in a read only memory (ROM). The symbol ALE denotes an address latch enable signal acting as an address latch control signal. The symbol $\overline{PSEN}$ denotes a program store enable signal.

Figure 3:
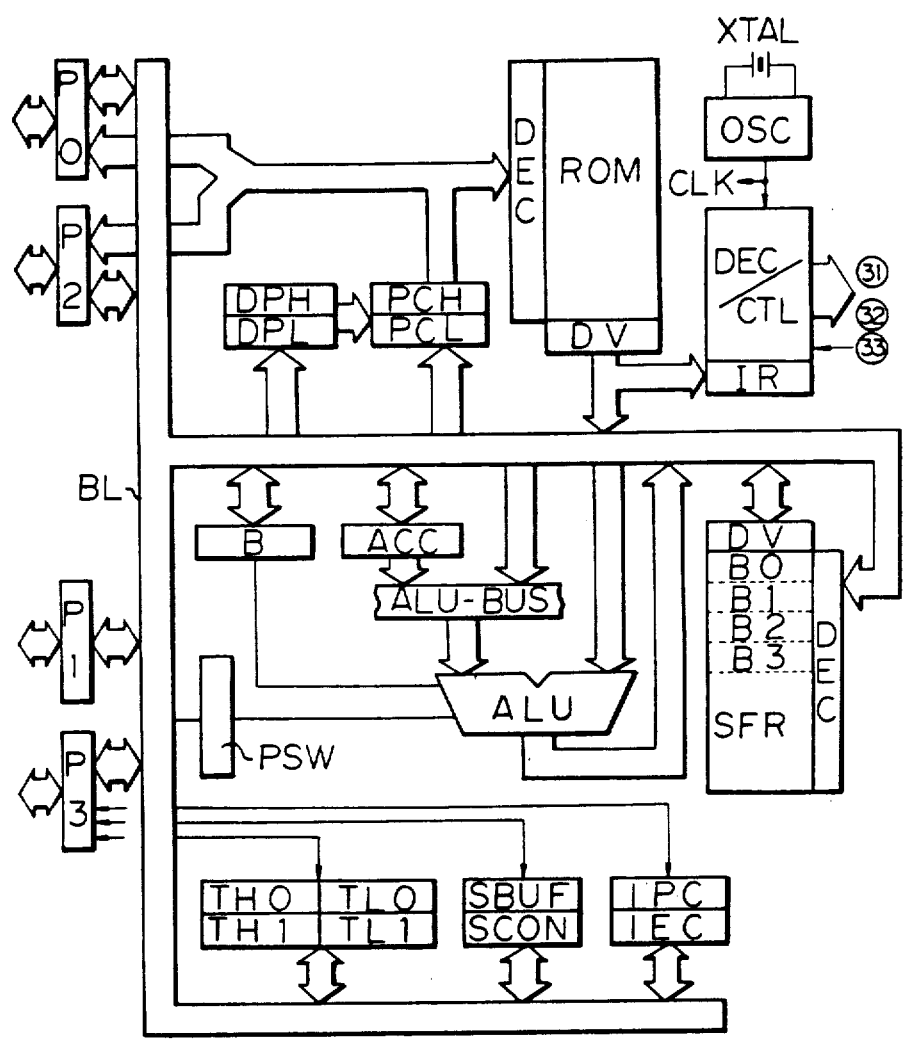
FIG. 3 is a block diagram representing an internal circuit construction of a conventional microcomputer unit.

FIG. 3 is a block diagram representing an internal circuit construction of a conventional microcomputer unit. The symbols P0 through P3 correspond to the aforementioned ports, i.e., P0.1 to P0.7, P1.1 to P1.7, P2.1 to P2.7, and P3.1 to P3.7, respectively; ALU to an arithmetic logic unit; ROM to the read only memory storing programs therein; DEC to a decoder; DV to a driver; OSC to an oscillator; CTL to a controller; IR to an instruction register; and BL to a bus line for transferring data and address signals. Other symbols, such as SCON, SBUF, PCH, and PCL, can be identified with reference to the table recited hereinbefore.

Figure 4:
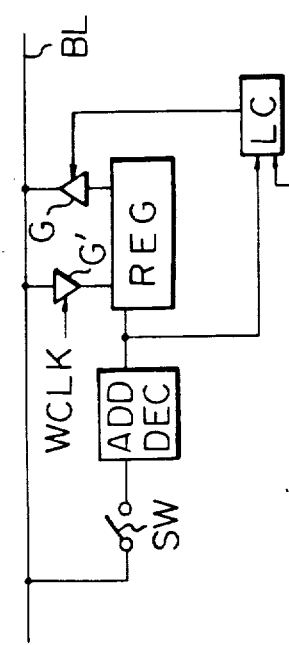
FIG. 4 is a simple block diagram illustrating a peripheral circuit around a register in the microcomputer unit.

FIG. 4 is a simple block diagram illustrating a peripheral circuit around a register in the microcomputer unit. Specifically, FIG. 4 illustrates the peripheral circuit around one of the SFR's. The symbol REG represents that register. As previously mentioned, since a specific address is allotted to each register, in advance, according to the present invention, corresponding address decoding means is needed. This means is mainly referenced by a symbol ADD DEC. If an address signal, directed to this register REG, is transferred on the bus line BL, the register REG can be accessed by means of the address decoder ADD DEC. The symbol G represents a gate/driver circuit for achieving a read operation. The symbol G' represents a gate/driver circuit for achieving a write operation controlled by a write clock WCLK. The blocks G and G' can be constructed of, for example, tristate buffer circuits. The read gate/driver G is controlled by a logic circuit LC receiving a clock signal CLK and also an output signal from the address decoder ADD DEC, that is, a selection signal for selecting the register REG. The symbol SW denotes a switch which is made conductive during every phase in which the data signal is not transferred on the bus line BL, but the address signal is transferred thereon.

Figure 5:
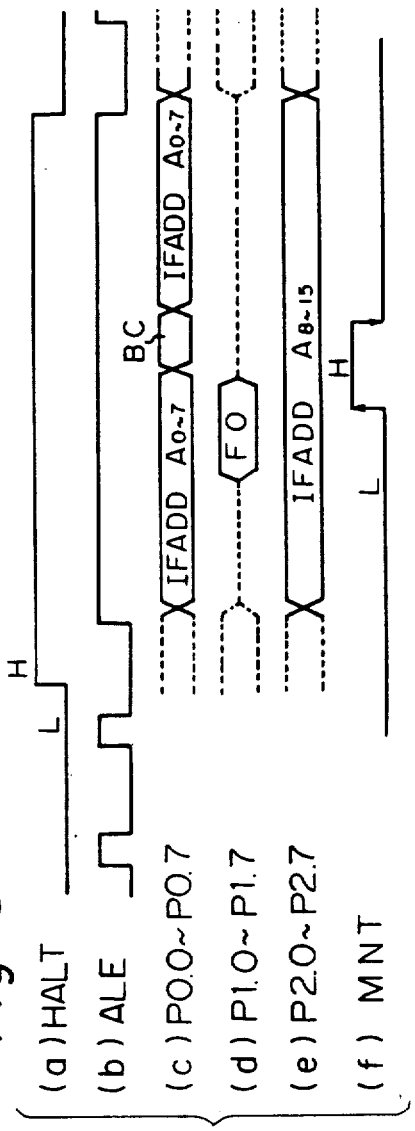
FIG. 5 is a timing chart used for explaining an operation according to the present invention.

FIG. 5 depicts a timing chart used for explaining an operation according to the present invention. First, the HALT signal, applied externally to the HALT pin ㉑ (in FIG. 2), changes its level from L (low) to H (high) (see row (a)). The HALT signal is not effective until execution of an instruction is completed in the microcomputer system. That is, the HALT signal is actually received or acknowledged by the microcomputer system at the time the execution of the instruction is completed, after which the system stops its operation.

More specifically, the increment of the program counter (PCH, PCL) is stopped and, at the same time, a NO OPERATION signal is supplied from the decoder/controller DEC/CTL (in FIG. 3) to the instruction register IR (in FIG. 3). At the same time, other counters (not shown in FIG. 3) also stop running. However, the oscillator OSC (in FIG. 3) remains running. As a result, the microcomputer system repeatedly executes the NO OPERATION cycle.

Thus, the level of the address latch enable (ALE) signal at the pin ㉛ (in FIG. 2) is maintained at H (see row (b)). The level of the program store enable ($\overline{PSEN}$) signal at the pin ㉛ (in FIG. 2) is also maintained at H (not shown in FIG. 5). At this phase, an instruction fetch address (IFADD) signal $A_0$ to $A_{15}$, to be fed from the program counter immediately after the HALT cycle, can be detected via the ports P0.0 to P0.7 and P2.0 to P2.7 (refer to rows (c), (e), and FIG. 2). Since IFADD is a 16-bit signal, two sets of 8-bit ports, i.e., P0.0 to P0.7 and P2.0 to P2.7, are required. It is clearly advantageous for an operator or programmer if the next IFADD can be easily recognized or output during a monitor of the microcomputer unit.

At the same phase as above, the ports P1.0 to P1.7 are in a waiting state for a following input. During this state, the address signal, for example, F0 (refer to the previously recited table) is externally supplied to the ports P1.0 to P1.7 (refer to row (d)), in a case where the B register is specified for the monitor. (F0 is expressed in hexadecimal notation and, therefore, is the same as 240 in decimal notation.) Thereafter, the MNT signal is externally supplied to the pin ㉒ (in FIG. 2). That is, the level of the MNT signal is changed from L to H (see row (f)).

The address signal F0 is transferred on the bus line BL (refer to FIGS. 2 and 4). On the other hand, the switch SW of FIG. 4 is made conductive in synchronism with the leading edge, from L to H, of the MNT signal (see row (f)). Accordingly, the address signal F0 selects the register REG of FIG. 4 by means of the address decoder ADD DEC. The address decoder ADD DEC produces the selection signal only when the address signal coincides with the address allotted to the corresponding register REG. The logic circuit LC of FIG. 4 activates the gate/driver G of FIG. 4 at the time the clock signal CLK is supplied thereto. Thus, the content BC of the register to be monitored is fed to the bus line BL. At this phase, the ports P0.0 to P0.7 are changed from a first mode where the IFADD signal is externally supplied to a second mode where the monitored content BC can be externally supplied therefrom (refer to the switched mode of row (c)). The content BC is actually applied to the ports P0.0 to P0.7 at the trailing edge of the MNT signal (see row (f)). The thus given content BC may be observed and recorded by a suitable external monitoring apparatus. Thereafter, the ports P0.0 to P0.7 produce the same IFADD signal again. A monitoring operation similar to that of the B register (F0) can also be applied to other registers.

When the monitoring operation is completed, the level of the HALT signal is changed from H to L (see row (a)). Therefore, the microcomputer unit changes its status from the HALT state to the normal operation state. At this time, when the ALE signal changes its level from H to L, the ports P0.0 to P0.7, P1.0 to P1.7, and P2.0 to P2.7 return to their status before the HALT state commenced.

According to the above explanation, the IFADD signal in FIG. 5 is automatically produced from the ports P2.0 to P2.7 and the ports P0.0 to P0.7 except for a period in which the content BC is produced therefrom. However it may also be possible to forcibly access the program counter, so as to produce the IFADD signal by externally applying the address signal, allotted to this program counter (refer to C1 and C0 in the previously recited table), to the ports P1.0 to P1.7, as in the above-mentioned B register.

According to the above explanation, the ports for producing the content BC and the ports for receiving the address signal FO are limited to the ports P0.0 to P0.7 and the ports P1.0 to P1.7, respectively. However, these ports may be arbitrarily chosen. Alternatively, in a microcomputer unit having a single set of ports, such as p1.0 to P1.7 only, this single set of ports is commonly used for receiving the address signal and for producing the content to be monitored alternatively.

Figure 6:
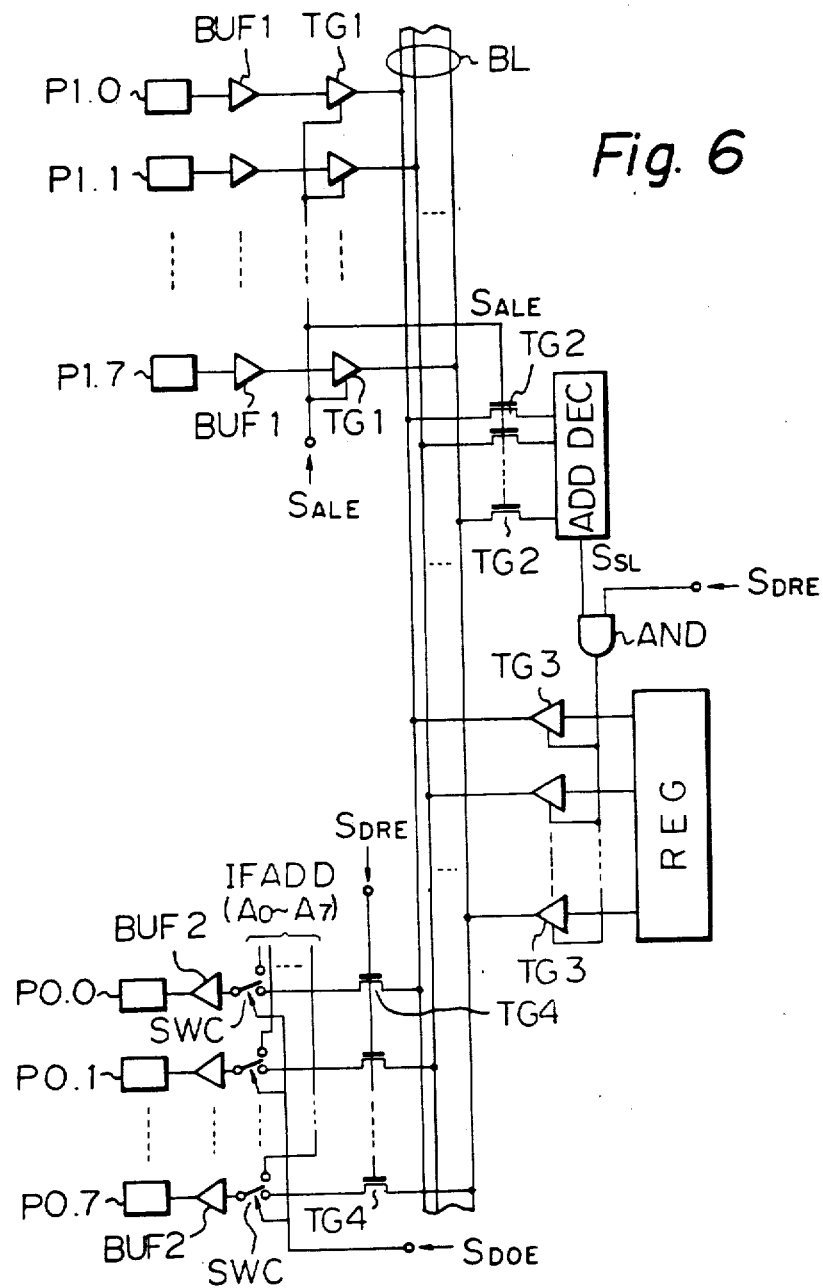
FIG. 6 is a more detailed circuit diagram representing a part of FIG. 3 for achieving a monitoring operation according to the present invention.

FIG. 6 is a more detailed circuit diagram representing a part of FIG. 3 for achieving a monitoring operation according to the present invention. In FIG. 6, an address signal for specifying a certain register to be monitored is externally applied to the ports P1.0 to P1.7 and transferred, via buffers BUF1 and transfer gates TG1, to the bus line BL. The transfer gates TG1 are turned on when the ALE signal $S_{ALE}$ is applied to each transfer gate TG1. Then the address signal on the bus line BL is applied to the address decoder ADD DEC via transfer gates TG2, which are now conductive based on the ALE signal $S_{ALE}$. If the address signal coincides with the address allotted to the register REG to be monitored, the corresponding address decoder ADD DEC produces a selection signal $S_{SL}$ which is applied to one input of an AND gate. The other input of the AND gate receives a data read enable (DRE) signal $S_{DRE}$. When both the signals $S_{SL}$ and $S_{DRE}$ are applied to the AND gate, the AND gate produces an output for turning on transfer gates TG3. Thus, a content of the register REG, i.e., data stored therein, is fed to the bus line BL. At this time, transfer gates TG4 are made conductive by the signal $S_{DRE}$. Therefore, the read data from the register REG is obtained at the ports P0.0 to P0.7, via switcher SWC and buffers BUF2 (refer to BC in row (c) of FIG. 5). Each switcher SWC connects a line connected to the gate TG4 when a data output enable (DOE) signal $S_{DOE}$ is generated. However, during the absence of signal $S_{DOE}$, the switchers SWC connect lines for transferring the IFADD signal (refer to IFADD $A_0$ to $A_7$ in row (c) of FIG. 5).

Figure 7:
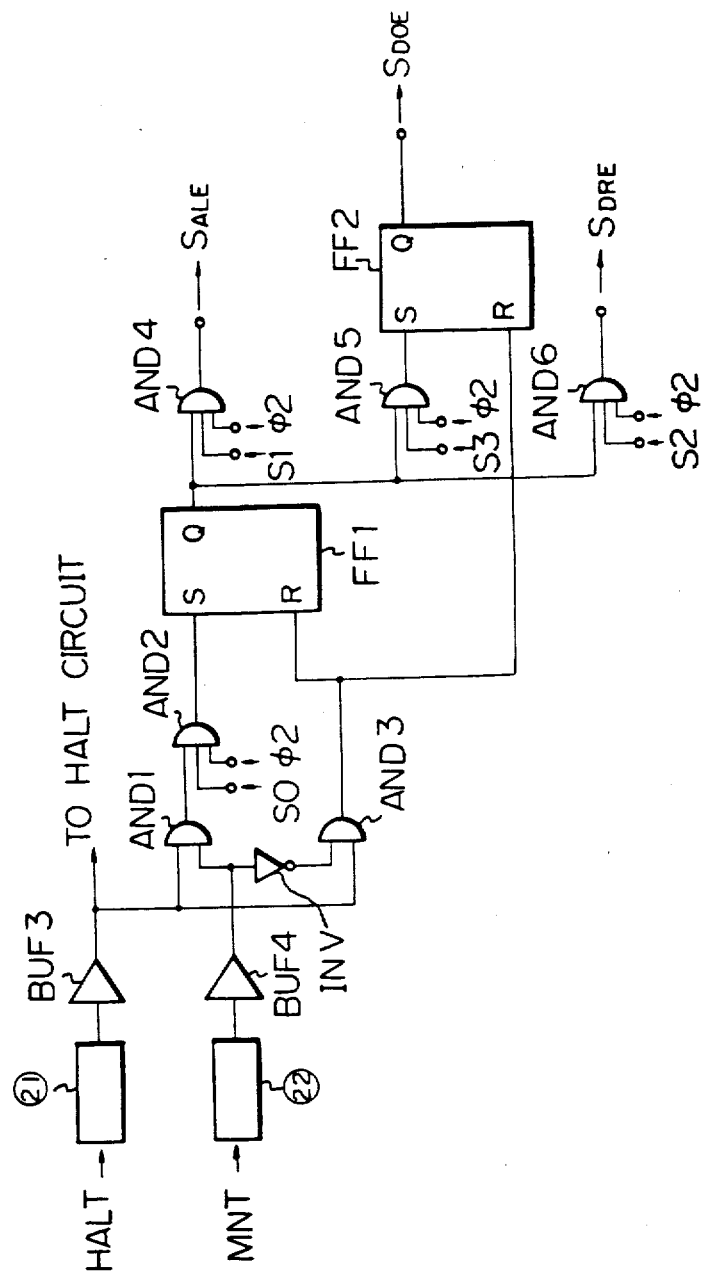
FIG. 7 is a circuit for generating signals $S_{ALE}$, $S_{DRE}$, and $S_{DOE}$ shown in FIG. 6.
Figure 8:
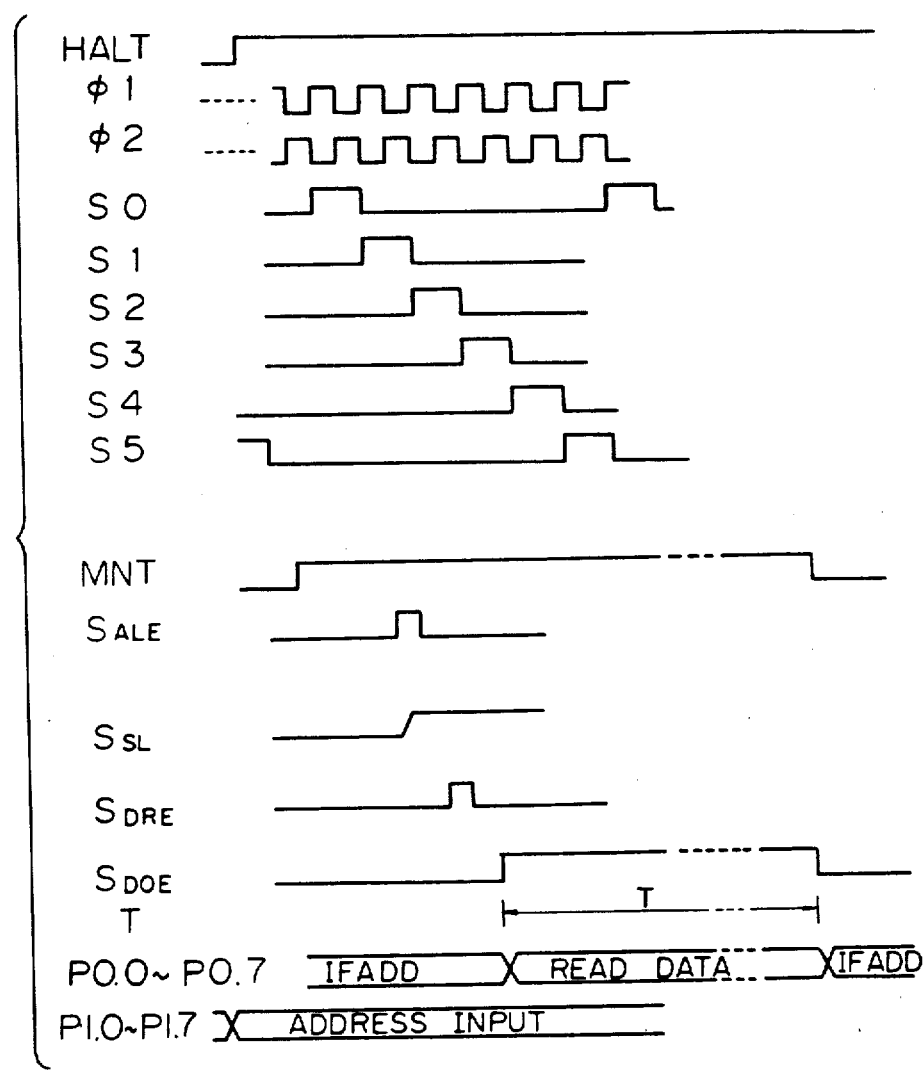
FIG. 8 is a timing chart used for explaining an operation of the circuit of FIG. 7.

FIG. 7 illustrates one example of a circuit for generating signals $S_{ALE}$, $S_{DRE}$, and $S_{DOE}$ shown in FIG. 6. In FIG. 7, signals HALT, MNT, ㉑, ㉒, $S_{ALE}$, $S_{DRE}$, and $S_{DOE}$ are already explained. The symbol BUF3 and BUF4 represent buffers, INV an inverter, AND1 to AND6 AND gates, and FF1, FF2 flip-flops. FIG. 8 depicts timing charts used for explaining an operation of the circuit of FIG. 7. The operation of the circuit of FIG. 7 will be clarified with reference to FIG. 8. The microcomputer unit of FIG. 2 is driven by, for example, six-phase signals S0 through S5. These phase signals define respective phases of an operation. That is, each instruction cycle is sequentially executed using six phases. The symbol $\phi 1$ is one basic clock signal, and $\phi 2$ is the other basic clock signal. The symbol T of FIG. 8 indicates a term or time period in which the read data is to be monitored (refer to BC in row (c) of FIG. 5). When the HALT signal and the MNT signal are applied to the pins ㉑ and ㉒, respectively, these signals open the gate AND1, via the buffers BUF3 and BUF4. Thereafter, the gate AND2 opens when the signal S0 and also the signal $\phi 2$ are generated. Thus the flip-flop FF1 is set. The Q-output thereof is applied to the gate AND4 and, thereby, the signal $S_{ALE}$ is produced therefrom when the signal $\phi 2$ and also the signal S1 are generated. In a similar way, the signal $S_{DOE}$ is generated by means of the gate AND5 and the flip-flop FF2 when the signal $\phi 2$ and also the signal S3 are generated. The signal $S_{DRE}$ is produced from the gate AND6 when the signal $\phi 2$ and also the signal S2 are generated.

When the desired monitoring operation is completed, the MNT signal is changed to a level of L. Therefore, the MNT signal of L opens, via the inverter INV, the gate AND3. Then the flip-flops FF1 and FF2 are reset so that the gate AND4, AND5, and AND6 are closed. Thus, the signals $S_{ALE}$, $S_{DOE}$, and $S_{DRE}$ are all released.

As explained above in detail, the microcomputer unit can produce data from the register to be monitored correctly. That is, the data produced is the data created or in the target register just at the moment the HALT signal is externally applied.

What is claimed is:

1. A microcomputer unit, comprising:
   general response registers each allotted an address respectively and being written into and read out from during a normal mode;
   a common bus operatively connected to the registers;
   port means, operatively connected to external pins of the microcomputer unit and said common bus, for communication between the inside and outside of the microcomputer unit, said port means comprising:
   a first port, operatively connected to said common bus, receiving an address signal for specifying a desired register to be monitored; and
   a second port, operatively connected to said common bus, for outputting the content read from the register to be monitored;
   a first terminal for receiving an external halt signal for halting operation of the microcomputer unit;
   a second terminal for receiving a monitor signal;
   microprocessor means, operatively connected to said common bus and said first terminal, for processing instructions using the common bus in the normal mode and halting in a halt state, during which instructions are not processed, in dependence on the halt signal when in the normal and a monitor mode; and
   control circuits provided for and each operatively connected to said common bus, the respective one of said registers and said second terminal, for detecting, during the monitor mode, whether the address signal on said common bus coincides with the address allotted to one of the registers to be monitored and transferring a content of the one of the registers corresponding to the address signal, via said common bus, to said second port in response to said monitor signal without changing the halt state of said microprocessor means, each control circuit comprising at least an address decoder receiving said external address signal, transferred on said common bus and producing a selection signal for the corresponding register, so that the content of the corresponding register is fed to said common bus.

2. A microcomputer unit as set forth in claim 1, wherein each control circuit generates a data read enable signal, each register includes, at its output, first transfer gates, and each address decoder includes, at its output, a 2-input AND gate, which output controls the on and off operation of the first transfer gates, the 2- input AND gate receiving, at one input, said selection signal and, at another input, the data read enable signal.

3. A microcomputer unit as set forth in claim 2, wherein said control circuit generates an address latch enable signal, wherein said first port includes second transfer gates connected to said common bus, and wherein said decoder includes third transfer gates connected to said bus line, and said second and third transfer gates are turned on and off by an address latch enable signal.

4. A microcomputer unit as set forth in claim 3, wherein said second port includes fourth transfer gates connected to said common bus, and the fourth transfer gates are turned on and off by said data read enable signal.

5. A microcomputer unit as set forth in claim 4, wherein said control circuit generates a data output enable signal, and wherein second port includes switchers connected to said fourth transfer gates, the switchers are controlled by the data output enable signal, and the switchers transfer said content of the register to be monitored and an instruction fetch address signal which is an address of an instruction to be executed next after completion of a monitor operation.

6. A microcomputer unit as set forth in claim 5, wherein first said halt signal is externally supplied, second said external address signal is supplied, third said monitor signal is externally supplied, fourth said address latch enable signal is generated in the microcomputer unit, fifth said selection signal is generated therein, sixth said data read enable signal is generated therein, and seventh said data output enable signal is generated therein.

7. A microcomputer unit as set forth in claim 1, wherein said first port for receiving said external address signal and said second port for producing the content of the register to be monitored are common and activated alternately.

8. A microcomputer unit, comprising:
a first terminal for receiving a halt signal;
a second terminal for receiving a monitor signal;
a common bus;
a first port, operatively connected to said common bus, for outputting an address of a next instruction from said common bus;
a second port, operatively connected to said common bus, for receiving a register address;
microprocessor means, including a general purpose register and operatively connected to said first and second terminals and said first and second ports via said common bus, said microprocessor means for processing instructions over the common bus and halting in dependence upon the halt signal in a halt state during which instructions are not processed; and control means, operatively connected to said first terminal, said common bus and said microprocessor means, for outputting the contents of the general purpose register to said first port via said common bus in dependence upon the halt signal, the monitor signal and the register address, the contents being the contents at the time the halt signal is received and the contents being transferred without changing the halt state of said microprocessor means.

9. A microcomputer unit as set forth in claim 8, wherein said control means comprises:
control signal means, operatively connected to said first and second terminals, for generating transfer control signals;
first transfer means, operatively connected to said second port and said control signal means, for transferring the register address in dependence upon the transfer control signals;
decoder means, operatively connected to said first transfer means, for generating a selection signal in dependence upon the register address;
an AND gate, operatively connected to said decoder means and said control signal means, for passing the selection signal therethrough in dependence upon the transfer control signals; and
second transfer means, operatively connected to said register, said AND gate, said first port and said control signal means, for transferring the contents of said register to said first port in dependence upon the selection signal and the transfer control signals.

10. A microcomputer unit as set forth in claim 9, wherein said control signal means comprises:
a first logic circuit operatively connected to said first and second terminals;
a first flip-flop operatively connected to said first logic circuit;
a second logic circuit operatively connected to said first flip-flop, said first transfer means and said AND gate; and
a second flip-flop operatively connected to said first and second logic circuits and said second transfer means.

11. A microcomputer unit as set forth in claim 10, wherein said first and second ports comprise a single input/output port.

12. A microcomputer unit as recited in claim 8, wherein said microcomputer unit is a single chip microcomputer unit.

* * * * *

UNITED STATES PATENT AND TRADEMARK OFFICE
CERTIFICATE OF CORRECTION

PATENT NO. : 4,667,285
DATED : May 19, 1987
INVENTOR(S) : TETSUO SUZUKI ET AL

It is certified that error appears in the above-identified patent and that said Letters Patent is hereby corrected as shown below:

Under "References Cited" add:

--Foreign Priority Application Data 56-202983     12/16/81 --.

Col. 5, line 9, change "arbitrarily chosen" to --chosen arbitrarily--.

Signed and Sealed this

Tenth Day of November, 1987

Attest:

DONALD J. QUIGG

Attesting Officer

Commissioner of Patents and Trademarks